United States Patent [19]

Nose et al.

[11] Patent Number: 4,544,269
[45] Date of Patent: Oct. 1, 1985

[54] DEVICE FOR MEASURING LIGHT INCIDENT ON AN OPTICAL SYSTEM

[75] Inventors: Noriyuki Nose; Kiyonobu Endo, both of Yokohama, Japan

[73] Assignee: Canon Kabushiki Kaisha, Tokyo, Japan

[21] Appl. No.: 284,114

[22] Filed: Jul. 16, 1981

[30] Foreign Application Priority Data

Jul. 25, 1980 [JP] Japan .................................. 55-101910
Jul. 25, 1980 [JP] Japan .................................. 55-101911
Jul. 25, 1980 [JP] Japan .................................. 55-101912

[51] Int. Cl.⁴ .......................... G01J 1/42; G02B 5/18
[52] U.S. Cl. .................................... 356/222; 354/429; 350/162.17; 350/169
[58] Field of Search ........................ 350/162.11, 162.17, 350/162.18, 162.19, 162.2, 162.21, 162.22, 162.23, 162.24, 169, 174; 356/218, 222; 354/429, 432

[56] References Cited

U.S. PATENT DOCUMENTS 4,103,153  7/1975  Matsumoto et al. ............... 250/227
4,178,084 12/1979  Matsumoto et al. ............... 354/59

Primary Examiner—Bruce Y. Arnold
Attorney, Agent, or Firm—Fitzpatrick, Cella, Harper & Scinto

[57] ABSTRACT

A device for measuring light incident on an optical system comprises an optical system defining an optical path, a plurality of diffraction lattices arranged in the optical path, each of the diffraction lattices comprising a plurality of periodically arranged semireflecting oblique surfaces, and photodetector means for detecting each of the diffracted lights from the diffraction lattices distinctively. The diffraction lattices are each of different predetermined areas; however, when even light is input, each lattice diffracts the same total quantity of light to its respective detector.

9 Claims, 32 Drawing Figures

DEVICE FOR MEASURING LIGHT INCIDENT ON AN OPTICAL SYSTEM

BACKGROUND OF THE INVENTION

1. Field of the Invention

This invention relates to a device for measuring a light beam by means of a diffraction lattice (or grating). More particularly, the invention is concerned with such a device which is adaptable to a light metering device in a photographic camera.

2. Description of the Prior Art

The light metering device in a photographic camera splits a portion of an image-forming light beam which has passed through an object lens by a beam splitter, and the thus split light is detected by a light detector. For the light beam splitter useful for such a light metering device, there has so far been used a single half mirror which is obliquely provided in the camera. Such a beam splitting device for use in the camera, etc. should desirably be as thin as possible. U.S. Pat. No. 3,464,337 discloses a device in which two members each providing on its surface a plurality of slant reflective surfaces, are cemented together to form a prismatic line raster and part of the incident light is split in a geometrical-optics manner for light metering.

The present invention is to provide such a light metering device, but having a beam splitting device of much thinner thickness by the use of a diffraction lattice.

The characteristic which is desired of the diffraction grating in that case is that useless diffracted light, except a light beam having image formation which emerges from the diffraction grating and diffracted light of a specific order for light metering, is not created. The reason is that such diffracted light creates flare light or ghost image and is detrimental to the formation and observation of the object image.

A beam splitter which meets such a demand is disclosed in applicant's Japanese Laid-open patent application No. 42042/1978. The beam splitter disclosed therein employs a relief type diffraction grating of high mass-productivity.

As described in the specification of the aforementioned patent application, a diffraction grating by periodical concave-convex structure of its surface is usually called a relief type diffraction grating, and beam splitters utilizing such diffraction lattices can be mass-produced from a matrix by the use of a copy making technique such as compression or the like, and also permit utilization of materials such as various stable plastics known in this field of art, which leads to a cost advantage.

On the other hand, in the light metering device of a single lens reflex camera or the like, it is desired that light meterings different in light metering area, namely, average light metering in which the light from substantially the whole of the object field is metered and partial light metering in which only the light from a part of the object field is metered both be possible. Beam splitting devices which have achieved such a purpose are disclosed in U.S. Pat. Nos. 4,103,153 and 4,178,084. The devices disclosed in these patents comprise holographically prepared diffraction lattices of different areas superposed one upon the other, and independently take out split lights of different metering ranges corresponding to those areas. However, these plural split lights differ from each other in quantity of light detected by a detector, substantially in proportion to the area and therefore and, when the light metering system is changed in the same camera, it is necessary to re-adjust the output level.

SUMMARY OF THE INVENTION

It is an object of the present invention to provide a device for measuring light incident on an optical system which can measure incident lights of different ranges at a time and which is thin and easy to manufacture.

It is another object of the present invention to provide a device for measuring light incident on an optical system in which beam splittings of areas of different expanses are effected at a time and those split beams can be distinctively taken out, and wherein the quantity-of-light levels of the split beams are substantially equal independent of the difference in area.

The present invention will become fully apparent from the following detailed description thereof taken in conjunction with the accompanying drawings.

DESCRIPTION OF THE PREFERRED EMBODIMENTS

Figure 1:
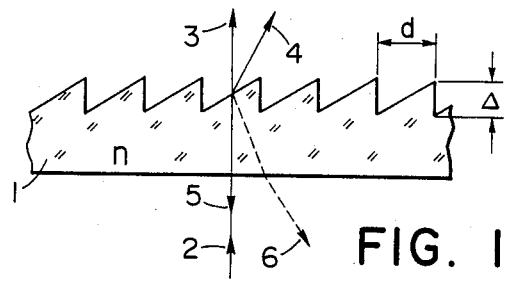
FIG. 1 is a cross-sectional view of a relief type diffraction lattice.

Reference is first made to FIG. 1 to describe the diffraction characteristic of a relief type (particularly, blazed) diffraction lattice. The beam splitter disclosed in the aforementioned Japanese Laid-open patent application No. 42042/1978 uses, particularly among relief type diffraction lattices, a blazed diffraction lattice having a characteristic which diffracts almost all of the quantity of incident light to a specific diffraction order, to render the diffraction efficiency of 0-order transmitted diffracted light having information of an object image to 90% or higher, the diffraction efficiency of primary diffracted light for light metering to several %, and the diffraction efficiency of other orders of diffracted light to substantially zero.

In FIG. 1, reference numeral 1 designates a relief type blazed diffraction lattice having a concave-convex structure of pitch (periodical interval) d and amount of concavo-convexity formed on the surface of a transparent member of refractive index n.

Light 2 incident on the diffraction lattice is diffracted, whereby 0-order transmitted diffracted light 3 transmitted in the same direction as the incident light and N-order transmitted diffracted light 4 are produced as transmitted light while 0-order reflected diffracted light 5 reflected in the direction of specular reflection (mirror surface reflection) and N-order reflected diffracted light 6 are produced as reflected light. N is an arbitrary integer.

Figure 2:
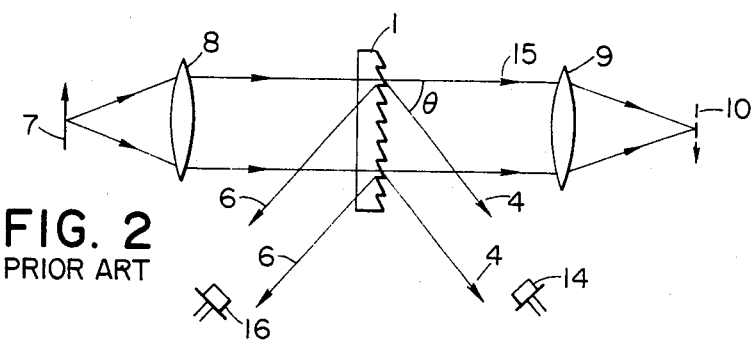
FIGS. 2, 3, 4, 5 6A and 6B illustrate a light metering device using a relief type diffraction lattice according to the prior art.

FIG. 2 shows an example in which light metering is effected with the relief type diffraction lattice of FIG. 1 disposed in an imaging optical system. This imaging optical system corresponds to the phototaking lens, the finder optical system or the like in a camera. The imaging optical system forms the object image 10 of an object 7 by lenses 8 and 9, and the diffraction lattice 1 is disposed in the optical path thereof. Where light metering is to be effected by utilization of the N-order transmitted diffracted light 4, a light detector 14 is disposed for that purpose and, where light metering is to be effected by utilization of the N-order reflected diffracted light 6, a light detector 16 is disposed for that purpose. Describing the former case as an example, in order that no influence may be imparted to the action of the imaging device, the light detector must be disposed outside of the optical path of the image-forming light beam and the diffracted light must be diffracted in a direction outward of the lens 9.

The term "image-forming light beam" used herein refers to a light beam having the information of the object image either before or behind the object image plane. Accordingly, in a single lens reflex camera, this light beam corresponds to the light beam reaching the film surface or the light beam passing through the viewfinder optical system.

The reason why, in the beam splitter disclosed in the aforementioned Japanese Laid-open patent application No. 42042/1978, primary diffracted light is used as the split diffracted light taken out for light metering is that, as also described therein, it is difficult with the presently known blazed diffraction lattice to render only the diffraction efficiencies of two diffracted lights when diffraction orders are not adjacent to each other, for example, only the diffraction efficiencies of 0-order and 5th-order transmitted diffracted lights, higher than the diffraction efficiencies of the other diffracted lights.

Generally, when light is to be split in the direction of the angle of diffraction $\theta$ by the use of a diffraction lattice of pitch d, there is established the following relation between the pitch d and N-order angle of diffraction $\theta$:

$$d \sin \theta = N \lambda (\lambda: \text{incident light wavelength}) \ldots \quad (1)$$

As will readily be appreciated from this equation, if the order N of diffracted light used for light metering is low, the angle of diffraction $\theta$ and the pitch d are small. However, the angle of diffraction $\theta$ must be greater than a predetermined angle, for example, about 30°, in order that diffracted light for light metering may be taken out outside of the image-forming light beam. Therefore, for example, where 0-order transmitted diffracted light and primary diffracted light are used as the image-forming light and the diffracted light for light metering as in the beam splitter disclosed in the aforementioned Japanese Laid-open patent application No. 42042/1978 (N=1), and if diffracted light for light metering of the angle of diffraction $\theta = 30°$ and $\lambda = 0.55$ $\mu$m as mentioned previously is to be split, the pitch d of the diffraction is 1.1 $\mu$m from equation (1) and this means the necessity of a diffraction lattice of a very fine pitch, which in turn means the need for a very precise technique of manufacturing which causes an increase in mass production costs which increase is not preferred.

In contrast, a technique whereby secondary and higher order reflected diffracted lights are taken out as the split light and creation of lower order diffracted light is minimized to alleviate the conditions imposed on a relief type diffraction lattice and to obtain a beam splitter which is easy to manufacture, has been proposed in Japanese patent application No. 10190/1979 (U.S. Pat. No. 4,484,072), and the beam splitter disclosed therein will now be described.

In order that such a beam splitter may be used in the light metering device or the like of a camera, the lattice applied to the beam splitter must have 90% or more of 0-order transmission diffraction efficiency and several % of N-order transmission or reflection diffraction efficiency as the light beam for light metering.

It is further necessary that the other orders of diffraction efficiency be nearly approximate to zero. This is because such diffracted light provides a ghost image or flare light and this is not preferable.

Figure 3:
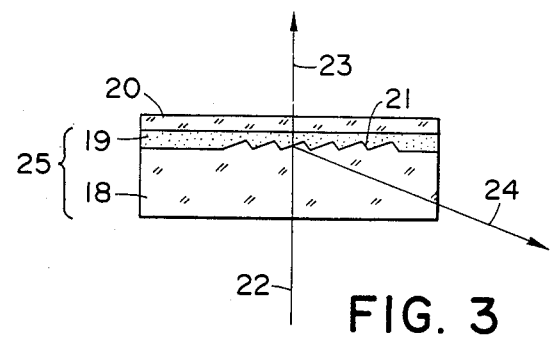

FIG. 3 shows an example of the beam splitter described in the aforementioned Japanese patent application No. 10190/1979.

In FIG. 3, reference numeral 18 designates an optically transparent member (for example, acryl, polystyrene or polycarbonite) formed on the surface thereof with a relief type diffraction lattice and having a refractive index $n_1$. Reference numeral 19 denotes an adhesive agent (for example, epoxy adhesive agent) having a sufficient thickness to embed the relief type diffraction lattice therein and having the same refractive index as the transparent member 18. Reference numeral 20 designates an optically transparent member formed of a material similar to the adhesive agent 19 and made optically integral with the transparent member 18 by the adhesive agent 19. These together constitute a beam splitter 25. Further, a dielectric film formed of silicon oxide or titanium oxide is deposited by evaporation on the surface of the relief type diffraction lattice to form a reflective film 21 having a certain design reflection factor.

Consider a case where such beam splitter 25 is disposed adjacent to the focal plane of the viewfinder of a single lens reflex camera and a light beam 22 from an object is incident thereon. Part of the incident light 22 is reflected by the reflective film 21 on the surface of the relief type diffraction lattice and the remainder of the incident light is transmitted. The light beam reflected by the reflective film 21 is subjected to the phase difference by the concavo-convex structure of the reflective film 21, thus producing a reflected diffracted light 24. The N-order reflection diffraction efficiency $\eta_R(N)$ in this case may be obtained from the following equations.

$$\eta_R(N) = R \times \frac{\sin^2(N\pi - \beta)}{(N\pi - \beta)^2} = R \times \text{sinc}^2(N\pi - \beta) \quad (2)$$

$$\beta = 2\pi n\Delta/\lambda \quad (3)$$

where R uses the reflection factor of the reflective film 21, and the above formula are the approximations in a case where the amount of concavo-convexity $\Delta$ of the diffraction lattice is small as compared with the pitch d.

Figure 4:
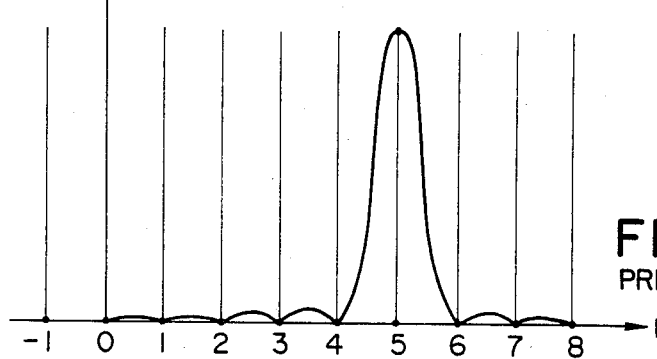

If 5th-order reflected diffracted light is used as the light beam for light metering, the amount of concavo-convexity $\Delta$ is determined so that the phase difference $\beta=5\pi$, thereby forming a diffraction lattice surface. At this time, as regards the reflected light from the diffraction lattice, only 5th-order reflected diffracted light 24 exists and the other orders of reflected diffracted lights do not exist. This is shown in FIG. 4. The diffraction efficiency of this 5th-order reflected diffracted light 24 is given as $\eta_R(5) = R$ from equation (2), and by suitably determining the reflection factor of the reflective film 21, there may be obtained a light beam from measurement having a desired intensity. This light beam for measurement is 5th-order diffracted light and therefore, as compared with a case where primary diffracted light is utilized, the diffraction lattice used in the beam splitter may sufficiently be a diffraction lattice having a pitch five times as gentle.

Figure 5:
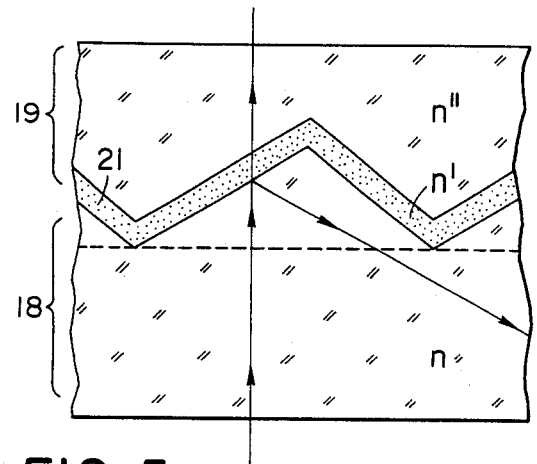

Next, an explanation will be given concerning the transmitted light. In FIG. 3, the light beam 22 incident on the beam splitter 25 is such that (1−R)% of light other than the aforementioned reflected diffracted light passes through the beam splitter 25 if there is no reflection by a surface other than the reflective film 21 or no loss of light in the medium. In this splitter, the refractive index of the transparent member 18 is equal to that of the adhesive agent 19 and therefore, the phase difference by the relief type diffraction lattice structure does not occur in the transmitted light and thus, other diffracted light than 0-order is not produced and accordingly, almost all of the transmitted light is 0-order transmitted diffracted light having the image information. An enlarged view of the portion of the relief type diffraction lattice of FIG. 3 is shown in FIG. 5.

As can be seen therefrom, in a beam splitter constituted by a diffraction lattice provided in a transparent body and having a plurality of semireflecting oblique surfaces periodically arranged, there are only obtained high order reflected diffracted light necessary for light metering and 0-order transmitted diffracted light necessary as the image-forming light beam and other unnecessary diffracted lights are not produced. These two diffracted lights can be controlled in the ratio of their respective diffraction efficiencies by suitably setting the reflection factor of the reflective film 21.

Detailed description of the foregoing points can be found in Japanese patent application No. 10190/1979.

Such a beam splitter has means having the diffraction lattice surface of a diffraction lattice as one reflecting surface thereof and any high order reflected diffracted light may be obtained by virtue of this reflecting surface and, for the light transmitted through the reflecting surface, such a beam splitter has means for controlling the phase difference of the transmitted light, whereby the beam splitter is one in which any light other than a desired split light is not produced and in which a great split angle is provided even by the use of a diffraction lattice of relatively gentle pitch. This means good mass productivity of such a beam splitter.

Figure 6A:
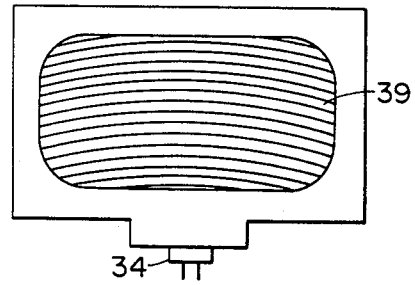
Figure 6B:
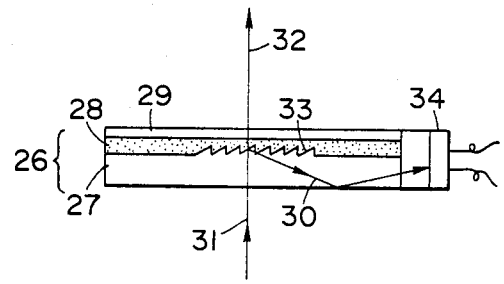

Description will now be made of a case where a beam splitter provided with a relief type diffraction lattice as previously described is applied to the light metering device of a single lens reflex camera or the like. FIGS. 6A and 6B show a beam splitter which is very useful to take out split light. FIG. 6A is a plan view of such a beam splitter and FIG. 6B is a cross-sectional view thereof. This beam splitter has high utility for a light metering device. In this beam splitter, the reflected diffracted light split for light metering is directed to a light detector 34 while being totally reflected by the inner surface of a transparent body 27. Accordingly, the angle of diffraction of the reflected diffracted light is determined by a condition for causing total reflection.

In the beam splitter utilizing such total reflection, the light transmitting member and the diffraction lattice are made integral with each other and therefore, such a beam splitter may vary advantageously be disposed in an optical device.

As shown in FIG. 6A, lattice lines 39 are curved in order that the split light from each point may efficiently enter the light detector 34. Consequently, the beam splitter of FIG. 6 disposed in the imaging light beam of a camera can be endowed with a light condensing function so that it directs part of the split imaging light beam to the light detector and further effectively condenses light onto the light detector having a small light-receiving element surface like that of a silicon light detector. If, as shown in FIG. 6A, the lattice lines are formed in the form of concentric circles centered at the light detector, diffracted light can be condensed onto the light detector to enable the metering light beam to be used effectively. Also, the quantity of light split to the light detector can be controlled by the reflection factor of the reflective film on the relief type diffraction lattice and therefore, if this reflection factor is varied from place to place, the light metering distribution can be controlled. Further, if, in a beam splitter, different diffraction lattice structures are given in accordance with the areas to be divided and light detectors are provided so as to receive each diffracted light, then only each area can be individually metered by each light detector. For the light metering of a single lens reflex camera, different light metering systems such as average light metering, partial light metering and spot light metering are adopted depending on the size of the metering area relative to the object view field.

The device of the present invention realizes two or more of these light metering systems by a single beam splitter and moreover, the invention provides a beam splitter which enables the output levels of the light metering systems, namely, the total quantities of light entering the light detectors, to be made coincident with each other by making the characteristics of the relief type diffraction lattices differ from each other. Making the output levels of the light metering systems coincident with each other means that the light reception coefficients of cameras (defined by the logarithm of the ratio of the quantity of metering light to the film surface illumination with 2 as the bottom), has a feature that even when the light metering system has been changed, the adjustment of the detecting circuit system corresponding to the light metering output level becomes unnecesssary.

The device of each embodiment of the present invention makes the light metering by various light metering systems possible by a beam splitter having a plurality of diffraction lattices different in area without interchanging the beam splitter, and further makes the grating conditions of the diffraction lattices differ from each other to make the levels of quantity of light of split lights equal to each other independently of the area, thus eliminatng the necessity of adjusting the detector side for each light metering system.

In a first embodiment of the present invention, the distributions of the angle of grating of the diffraction lattice are made to differ from each other to adjust the levels of quantity of light of the split lights.

Figure 7A:
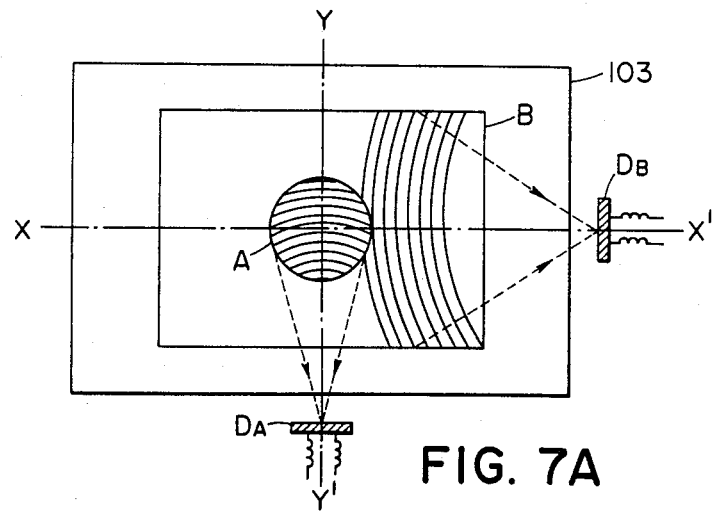
FIGS. 7A, 7B and 7C are a plan view and cross-sectional views, taken in two vertical directions, of the device of a first embodiment in which the distribution of the angle of grating is made to differ between two lattices.

FIG. 7A is a plan view of the device of the first embodiment and shows the whole of a light metering view field 103. Within the light metering view field 103, two zones A and B are provided with at least portions thereof superposed one upon the other, and the circular zone A corresponds to partial light metering and the rectangular zone B corresponds to average light metering. The gratings of the zones A and B are endowed with the light condensing function, and lattice lines are formed in the form of concentric circles centered at the light detector to enable the light metering beam to be effectively used. Therefore, light having entered the zone A is diffracted and guided to a light detector $D_A$ and light having entered the zone B is diffracted and guided to a light detector $D_B$.

Figure 7B:
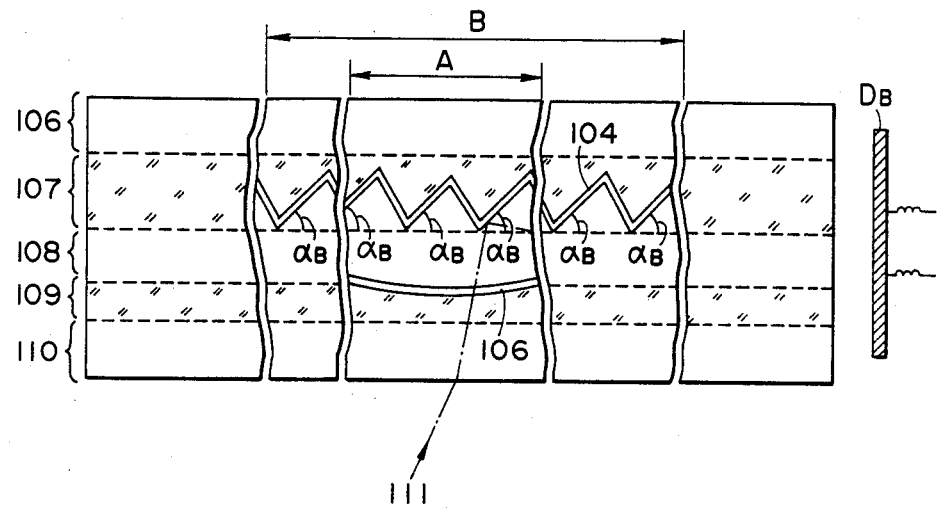
Figure 7C:
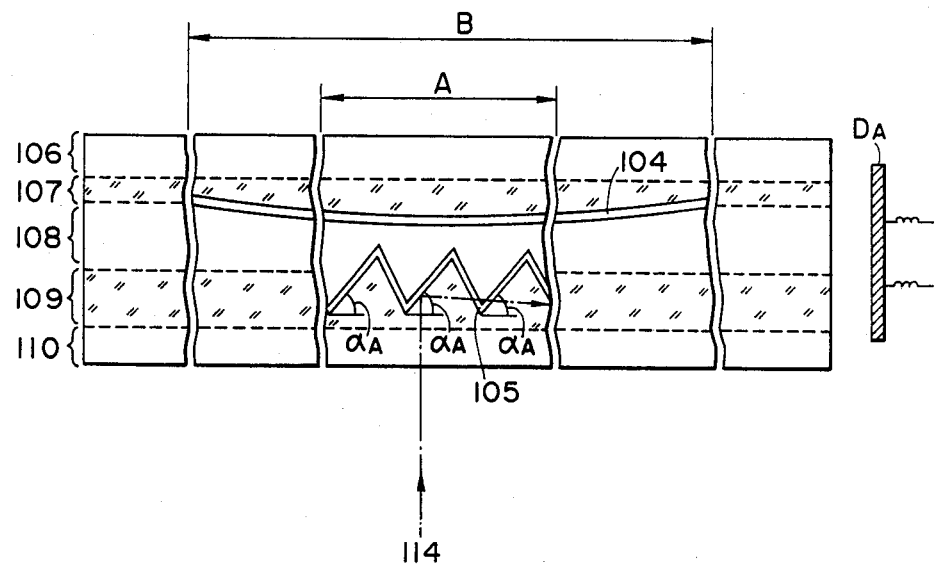
Figure 8:
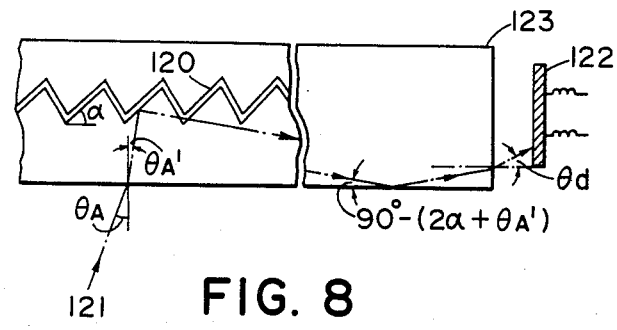
FIGS. 8, 9 and 10 illustrate the variation in quantity of light of the detector corresponding to the variation in the angle of grating.

FIG. 7B is a cross-sectional view taken along the plane X-X' of FIG. 7A, and FIG. 7C is a cross-sectional view taken along the plane Y-Y' of FIG. 7A. In FIGS. 7B and 7C, reference numeral 104 designates a reflective film on the relief type diffraction lattice surface in zone B, reference numeral 105 denotes a reflective film on the relief type diffraction lattice surface in zone A, reference numerals 106, 108 and 110 designate optically transparent bodies, reference numerals 107 and 109 denote optically transparent adhesive layers, reference numeral 111 designates an incident light, and $D_B$ denotes a light detector disposed adjacent to the center of curvature of the lattice in zone B. $D_A$ designates a light detector disposed adjacent to the center of curvature of the lattice in zone A. The present embodiment provides a beam splitter which comprises a relief type diffraction lattice having at least two light condensing points and which realizes two or more light metering systems by a single beam splitter in which the output levels of the light metering systems can be made coincident with each other by changing the shape, particularly the angle of grating, of the relief type diffraction lattice of the beam splitter. In FIGS. 7A and 7B, assuming that the angles of grating of the zones A and B are $\alpha_A$ and $\alpha_B$, respectively, the size relation between the respective zones is $\alpha_A > \alpha_B$, and the quantities of metering light in zones A and B can be made equal to each other by increasing the angles of grating in accordance with the small degree of light metering area. The angle of grating refers to the angle formed by the effective reflecting surface forming the split light with the diffraction lattice surface in which the diffraction lattice lies, in a cross-section substantially perpendicular to the lattice lines. Reference is now made to FIG. 8 to describe the reason why the quantity of metering light is increased if the angles of grating are increased. FIG. 8 shows the condition when light has entered at an angle of incident $\theta_A$, the beam splitter of a relief type diffraction lattice having an angle of grating $\alpha$. Assuming that the angle of incidence in the beam splitter is $\theta_A'$ and the refractive index of the beam splitter is n, the light after being reflected by a reflective film 120 travels at an angle of about $90° - (2\alpha + \theta_A')$ with respect to the upper and lower boundary surfaces of the beam splitter. At this time, consider a case where $\alpha \leq 45°$. Assuming that the angle of emergence of the reflected light emerging from the end surface 123 of the light detector side is $\theta_d$, $\theta_d$ is in the following relation:

$$\theta_d = \sin^{-1}[n \sin\{90° - (2\alpha + \theta_A')\}] \qquad (5)$$
$$= \sin^{-1}\{n \cos(2\alpha + \theta_A')\}$$

particularly, when light enters the beam splitter perpendicularly thereto, namely, when $\theta_A = \theta_A' = 0°$, equation (5) becomes $$\theta_d = \sin^{-1}\{n \cos(2\alpha)\} \qquad (6)$$

As can be seen from equations (5) and (6), if the angle of grating $\alpha$ of the relief type diffraction lattice becomes greater, the angle of emergence $\theta_d$ becomes smaller. For example, if n=1.49, it follows from equation (6) that when the angle of grating $\alpha$ is 33.5°, the angle of emergence $\theta_d$ is 35.6° and that when the angle of grating $\alpha$ is 38°, the angle of emergence $\theta_d$ is 21.1°.

Also, when the angle of grating $\alpha$ is greater than 45°, equations (5) and (6) are rewritten as follows:

$$\theta_d = \sin^{-1}[n \sin\{(2\alpha + \theta_A') - 90°\}] \qquad (7)$$
$$= \sin^{-1}\{-n \cos(2\alpha + \theta_A')\}$$

particularly, when $\theta_A = \theta_A' = 0°$, $$\theta_d = \sin^{-1}\{-n \cos 2\alpha\} \qquad (8)$$

Again in this case, the angle of emergence $\theta_d$ can be suitably controlled by adjusting the angle of grating $\alpha$.

Now, there is a correlation between the angle of emergence $\theta_d$ and the quantity of light entering the light detector, and this will be described by reference to FIG. 9.

Figure 9:
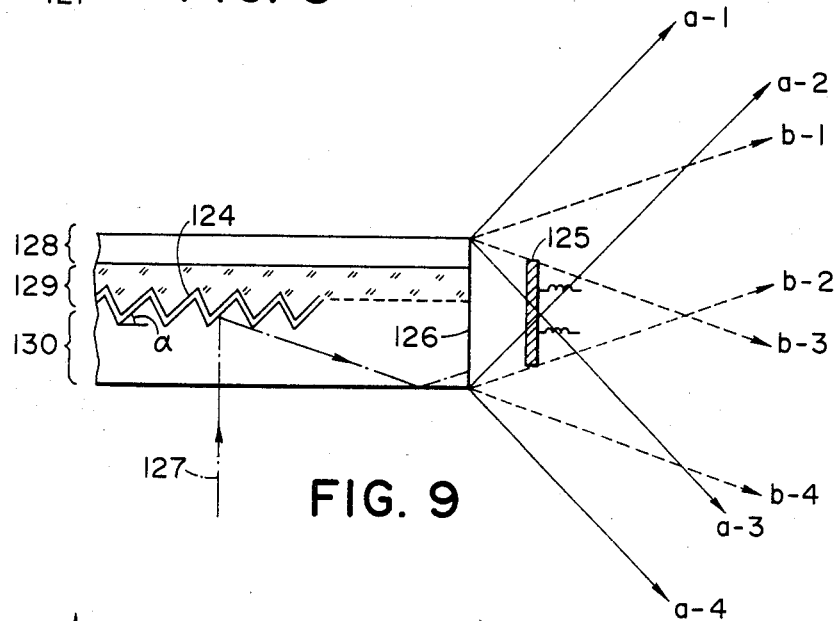

FIG. 9 shows the comparison between the quantities of light entering the light detector with respect to a case where the angle of emergence $\theta d$ assumes two different values. Solid-line arrows indicate a case where the angle of emergence $\theta d$ is great, and dotted-line arrows indicate a case where the angle of emergence is small. The light rays indicated by solid lines and dotted lines are designated by A and B with suffix numbers added thereto. The light rays shown in FIG. 9 indicate the lights at the upper and lower ends, of the lights emerging from the exit end 126 of the beam splitter. Accordingly, the lights emerging from the beam splitter are the light defined between the light rays A-1 and A-2 and the light defined between the light rays A-3 and A-4 when the angle of emergence $\theta d$ is great, and the light defined between the light rays B-1 and B-2 and the light defined between the light rays B-3 and B-4 when the angle of emergence θd is small. As can be seen from FIG. 12, if the exit end 126 of the beam splitter and the light detector 125 are spaced apart from each other, the quantity of light entering the light detector 125 is smaller when the angle of emergence θd is great than when the angle of emergence θd is small. That is, as the angle of emergence θd is smaller, the quantity of light entering the light detector 125 is greater and the sensitivity on the light metering surface is varied by the angle of grating α.

Figure 10:
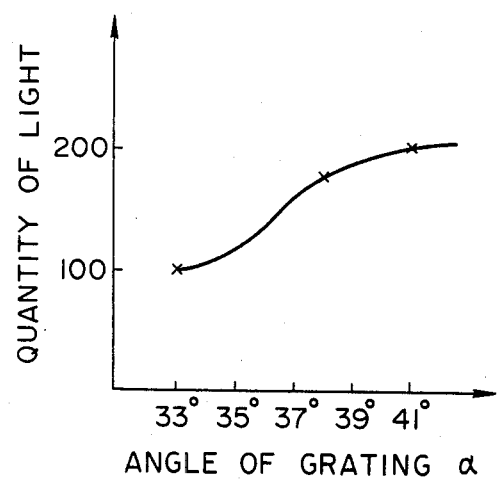

It is seen from equations (5) and (6) that if the angle of grating α becomes greater, the angle of emergence θd becomes smaller and the quantity of light entering the light detector 125 increases. FIG. 10 shows the function of the quantity of metering light corresponding to the empirically obtained variation in α when the quantity of metering light entering the light detector from a unit light metering area when the angle of grating α is 33° is 100.

Thus, the quantity of metering light I in the unit light metering area is the function of the angle of grating α in the light metering surface and therefore, I can generally be expressed as I(α) and, assuming that the total quantities of metering light in zones A and B are $I_A$ and $I_B$, respectively, $$I_A = \int_{S_A} I(\alpha_A) dS$$

$$I_B = \int_{S_B} I(\alpha_B) dS$$

where $S_A$ and $S_B$ represent the light metering areas in zones A and B, respectively. Accordingly, if the angle of grating α is different, adjustment can be made so that the total quantities of metering light, namely, the light reception coefficients, in the respective zones are coincident with each other by adjusting $\alpha_A$ and $\alpha_B$ so that $I_A = I_B$ even though the areas of the respective zones differ from each other.

The present embodiment utilized the above-described characteristics to vary the angle of grating α for each of the relief type diffraction lattices in the respective zones whose areas differ from each other, thereby enabling the quantities of metering light of the respective light metering systems to be equal to each other. At this time, in each zone, α may be made constant or a predetermined distribution may be provided in accordance with the light metering system, and the reflection factor of the reflective film provided on the lattice surface may be constant. For the reason set forth above, the partial light metering of zone A shown in FIG. 7A and the average light metering of zone B exist in a single beam splitter and moreover, the quantities of metering light can be made equal to each other. In the present embodiment, the angles of grating in the respective zones are made constant, i.e., $\alpha_A$ and $\alpha_B$, respectively.

Generally, it is not always a necessary condition that, as shown in FIGS. 7B and 7C, the surfaces on which the diffraction lattices corresponding to the respective light metering areas are provided differ from each other, and even if the diffraction lattices are provided in the same surface, it is possible to equalize the quantities of metering light in the respective light metering areas.

Figure 11A:
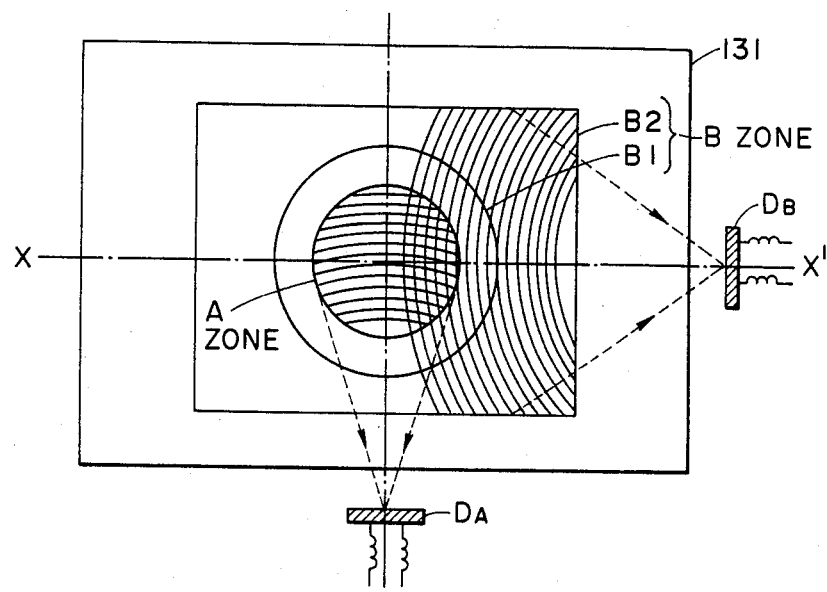
FIGS. 11A and 11B are a plan view and a cross-sectional view, respectively, of the device of a first embodiment in which two lattices are provided in the same plane.
Figure 11B:
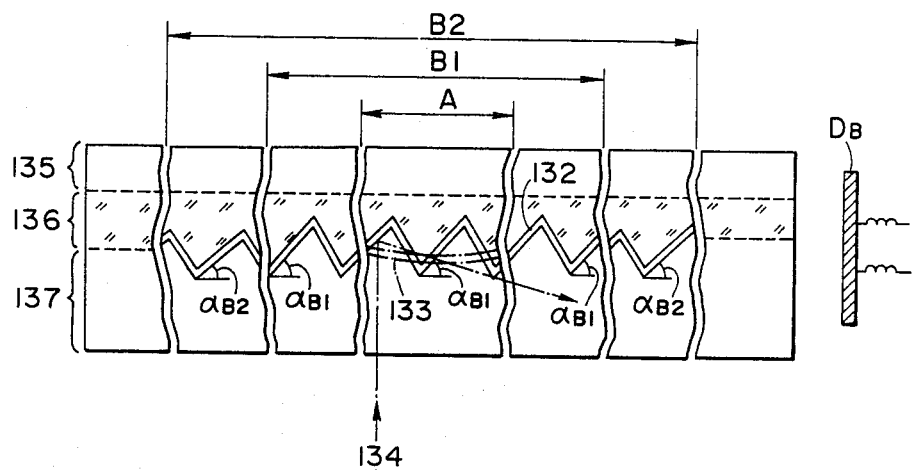

FIG. 11 shows a device having two relief type diffraction lattices made in the same plane. FIGS. 11A and 11B are cross-sectional views of a device in which two types of light metering system, i.e., average light metering and partial light metering, are realized by a single beam splitter. The difference of this device from the device of FIG. 7 is that the diffraction lattices which achieve two types of light metering exist in the same plane. FIG. 11B is a cross-sectional view taken along the plane X-X' of FIG. 11A. Reference numeral 131 designates a light metering view field, reference numeral 132 denotes a reflective film provided on the relief type diffraction lattice in zone B, reference numeral 133 designates a reflective film provided on the relief type diffraction lattice in zone A, reference numeral 134 denotes an incident light, reference numerals 135 and 137 designate optically transparent bodies, and reference numeral 136 denotes a transparent adhesive layer. Zone B comprises two subzones $B_1$ and $B_2$. Zone A is for partial light metering and zone B is for average light metering and, if the angles of grating of the zones A, $B_1$ and $B_2$ are $\alpha_A$, $\alpha_{B1}$ and $\alpha_{B2}$ these are in the relation that $\alpha_A > \alpha_{B1} > \alpha_{B2}$, and the quantity of metering light of the average light metering in zone B is equal to the quantity of metering light of the partial light metering in zone A, and the average light metering in zone B is light metering with weight given to the center. $D_A$ and $D_B$ designate light detectors into which the reflected diffracted lights from zones A and B enter.

Figure 12A:
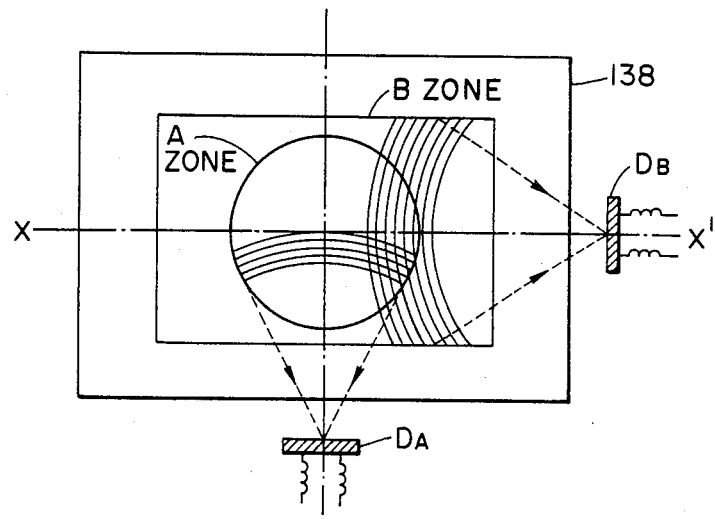
FIGS. 12A and 12B are a plan view and a cross-sectional view, respectively, of a device in which the angle of grating is varied in the same lattice.
Figure 12B:
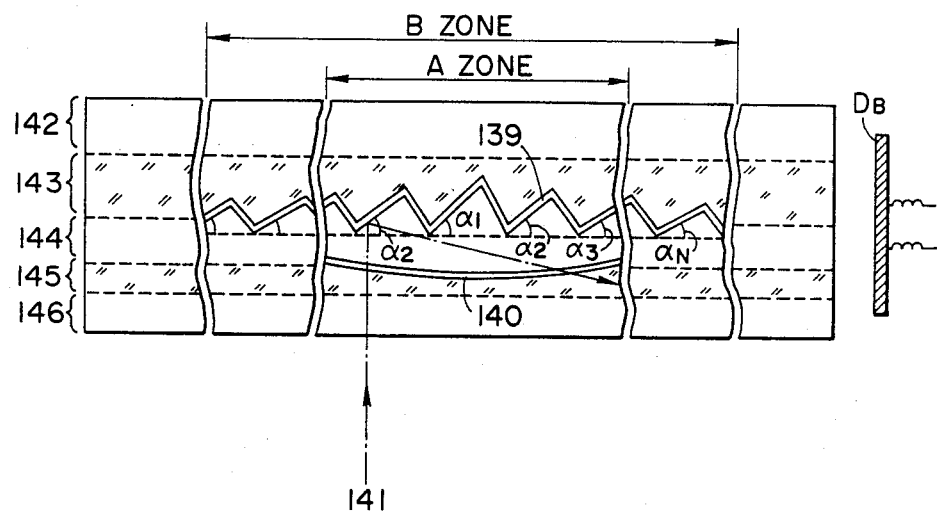

FIG. 12 shows a device in which the angle of grating has been continuously varied. FIG. 12A shows the whole of the light metering view field and FIG. 12B is a cross-sectional view of the beam splitter taken along the plane X—X' of FIG. 12A. In FIGS. 12A and 12B, zone B corresponds to average light metering and zone As corresponds to partial light metering. Reference numeral 138 designates the light metering view field, reference numeral 139 denotes a reflective film provided on the relief type diffraction lattice in zone B, reference numeral 140 designates a reflective film provided on the relief type diffraction lattice in zone A, reference numeral 141 denotes an incident light, reference numerals 142, 144 and 146 designate optically transparent bodies, reference numerals 143 and 145 denote transparent adhesive layers, and $D_A$ and $D_B$ designate light detectors which receive the light directed by the diffraction lattices in zones A and B. In FIG. 12B, the relief type lattice in zone B has its angle of grating varied at each pitch. In the figure, $\alpha 1 > \alpha 2 \ldots > d2$ in zone B, and the light metering sensitivity is set so as to decrease toward the end of the light metering view field. Also, zone A is a predetermined angle $\alpha A$, and $I_A = I_B$ between the zones. The beam splitter of the present embodiment can be obtained by a method of shaping plastic from a matrix and making relief type diffraction lattices. In that case, a metal mold which provides the matrix can be made by mechanically grinding it by means of a diamond cutting tool and, during the grinding, the angle of inclination at which the cutting tool is applied to a blank for the metal mold may be varied for each pitch.

As indicated above, the device of the present embodiment is characterized in that in a beam splitter comprising at least two diffraction lattices, when light metering having at least two types of light metering areas is effected, the shape, particularly the distribution of the angle of grating, of the diffraction lattice is made to differ between the diffraction lattices to equalize the quantities of metering light in the light metering areas. This in turn leads to a feature that it is possible to realize two or more light metering systems by a single beam splitter and moreover to equalize the light reception coefficients of the light metering systems and thus, adjustment of the light metering output level for each light metering system becomes unnecessary. Herein, the fact that the distribution of the angle of grating differs means a case where $\alpha_A \neq \alpha_B$ as in the device of FIGS. 7B and 7C or a case where the degree of variation in $\alpha$ differs as in the device of FIG. 12.

In the device according to a second embodiment of the present invention, the reflection factors of the semireflecting oblique surfaces are made to differ for each lattice corresponding to each light metering system to adjust the quantity of output light from each lattice.

Figure 13A:
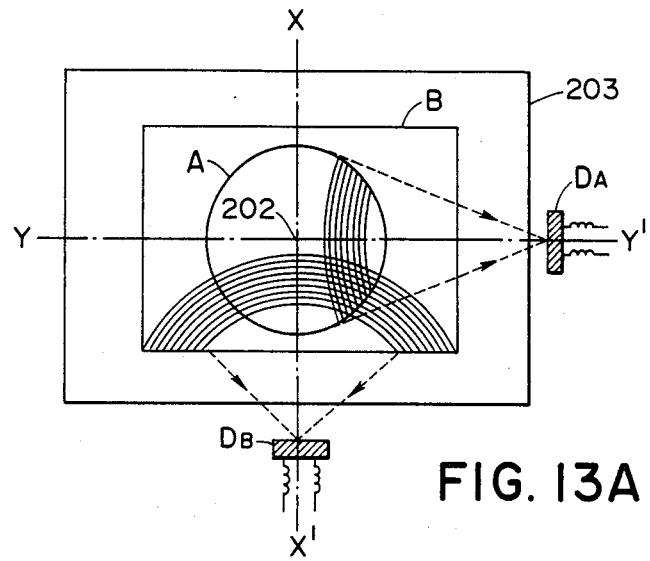
FIGS. 13A, 13B and 13C are a plan view and cross-sectional views, taken in two vertical directions, of a second embodiment in which the reflection factor of the diffraction lattice surface is made to differ between two lattices.
Figure 13B:
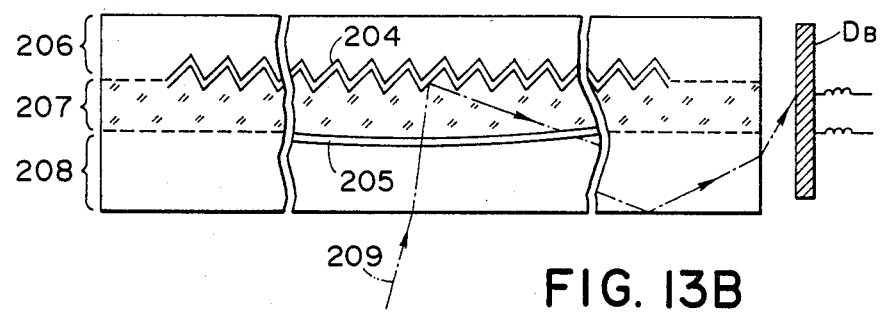
Figure 13C:
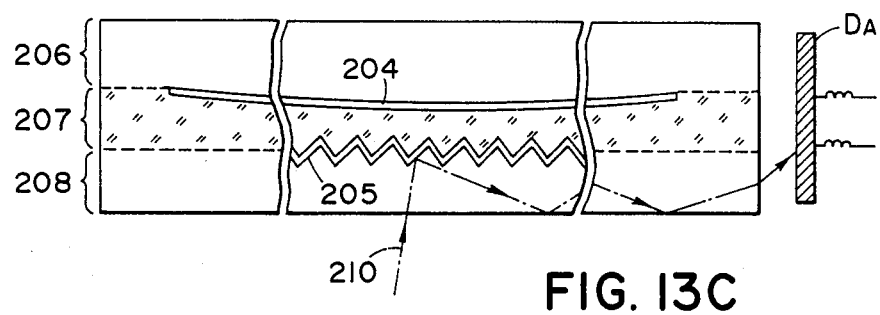

FIG. 13 illustrates a second embodiment of the present invention in which there are two light condensing points and a light detector is disposed at each of the light condensing points. FIG. 13A shows the whole of the light metering view field 203. Two zones, i.e. zone A and zone B, are set with the center of the light metering view field as the center, so that the light having entered zone A(circular) is diffracted and guided to a light detector $D_A$ and the light having entered zone B(rectangular) is diffracted and guide to a light detector $D_B$. The lattices in zones A and B are endowed with a light condensing action as shown in FIG. 6, and lattice lines are formed in the form of concentric circles centered at the light detector to enable the metering light beam to be effectively used. FIG. 13B is a cross-sectional view taken along the plane X—X' of FIG. 13A, and FIG. 13C is a cross-sectional view taken along the plane Y—Y' of FIG. 13A. In FIG. 13B, reference numeral 204 designates a reflective film on the relief type diffraction lattice surface in zone B, reference numeral 205 denotes a reflective film on the relief type diffraction lattice surface in zone A, reference numerals 206 and 208 designate optically transparent bodies, reference numeral 207 denotes an optically transparent adhesive layer, reference numeral 209 designates an incident light, and $D_B$ denotes a light detector disposed at the light condensing point of the lattice in zone B. Also, in FIG. 13C, reference numeral 205 designates a reflective film on the relief type diffraction lattice surface in zone A, reference numeral 204 denotes a reflective film on the relief type diffraction lattice surface in zone B, reference numerals 206 and 208 designate optically transparent bodies, reference numeral 207 denotes an optically transparent adhesive layer, reference numeral 210 designates an incident light, and $D_A$ denotes a light detector disposed at the light condensing point of the lattice in zone A. As can be seen in FIGS. 13B and 13C, the lattice surfaces in zone A and zone B are double and do not exist in the same plane. As can be seen in FIG. 13A, the area of zone A is smaller than the area of zone B and zone B includes zone A and therefore, if the lattices in the respective zones were provided in the same plane, the reflective film in zone A would be common to zone B and both of the respective zones would have the same reflection factor. Accordingly, in that case, it would be impossible to equalize the total quantities of light entering the light detectors corresponding to the respective zones by controlling only the reflection factor of the reflective film. Thus, in order that the total quantities of light entering the light detectors of the respective light metering systems may be equalized by controlling the reflection factor of the reflective film, it is necessary that the lattice surfaces do not lie in the same plane but lie in different planes.

In FIG. 13A, let $R_A$ be the reflection factor of the reflective film on the relief type diffraction lattice in zone A and $R_B$ be the reflection factor of the reflective film on the relief type diffraction lattice in zone B. Then, the situation in which the total quantities of light entering the light detectors from the lattices in the respective zones are equal may be expressed as follows:

$$\int \eta(R_A)dS = \int \eta(R_B)dS \qquad (9)$$

Area of Zone A  Area of Zone B

Figure 14A:
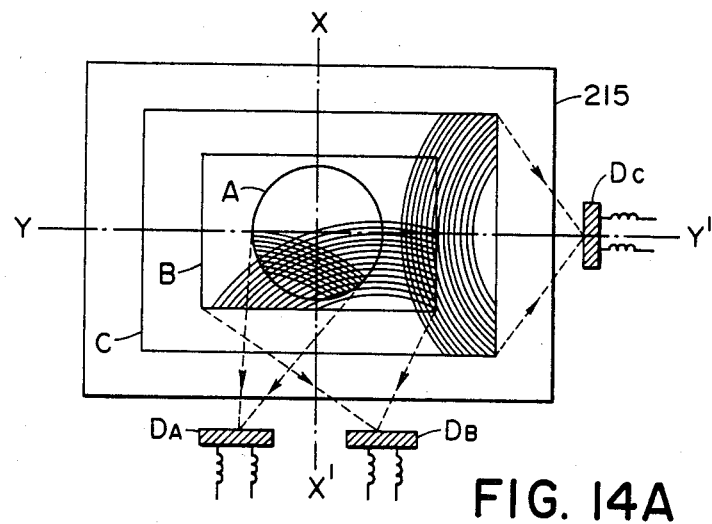
FIGS. 14A, 14B and 14C are a plan view and two cross-sectional views of a device in which the reflection factor of the lattice surface is made to differ between three lattices.
Figure 14B:
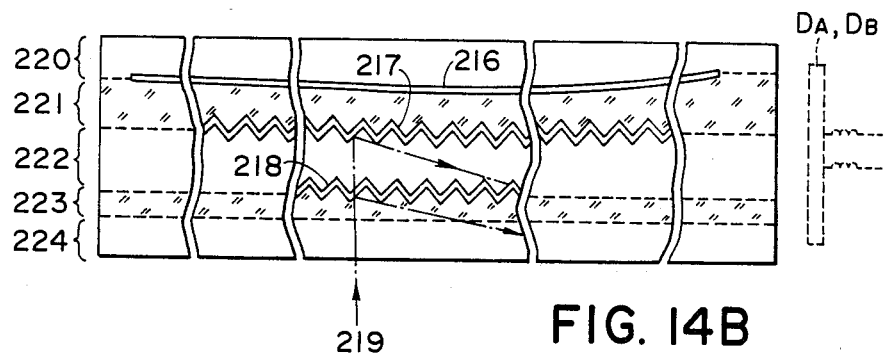
Figure 14C:
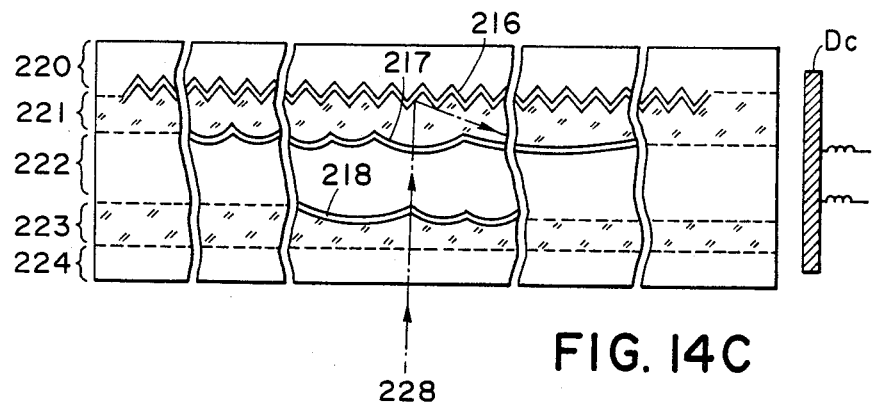

In equation (9), S represents the area, and $\eta$ represents the probability (%) with which the incident light enters the light detector and which is increased generally in proportion to the reflection factor. Since the area of zone B is greater than the area of zone A, equation (9) can be established by making the reflection factor $R_A$ greater than the reflection factor $R_B$. That is, the quantities of split light, namely, the total quantities of metering light, can be equalized by increasing the reflection factor of the reflective film in accordance with the smallness of the area. In FIG. 13A, zone A is used as partial light metering and zone B is used as average light metering, but generally, as described above, not only the reflective films in the respective zones can uniformly be controlled but also zone B may be subdivided into several areas and reflective films having different reflection factors may be provided in those areas and moreover, the total quantity of metering light in zone B and the total quantity of metering light in zone A can be made equal to each other. FIGS. 14A, 14B and 14C illustrates a second embodiment of the present invention. Three zones A, B and C are set in the whole light metering view field 215, and the reflection factors of the respective zones are set so that the total quantities of metering light from the respective zones are equal. That is, assuming that the reflection factors of the reflective films in zones A, B and C are $R_A$, $R_B$ and $R_C$, these reflection factors are rendered in the relation that $R_A > R_B > R_C$ which corresponds to the size relation of the light metering areas, and the reflection factors are increased by the inverse number of the small proportion of the areas so that the total quantities of metering light in the respective zones are equal. Zone A is for spot light metering, zone B is for partial light metering and zone C is for average light metering, and as shown in FIG. 14A, the lattices in the respective zones are formed in the form of concentric circles centered at light detectors $D_A$, $D_B$ and $D_C$, respectively. FIG. 14B is a cross-sectional view taken along the plane X—X' of FIG. 14A, and FIG. 14C is a cross-sectional view taken along the plane Y—Y' of FIG. 14A. Reference numeral 216 designates a reflective film on the relief type diffraction lattice in zone A, reference numeral 217 denotes a reflective film on the relief type diffraction lattice in zone B, and reference numeral 218 designates a reflective film on the relief type diffraction lattice in zone C. Reference numerals 220, 222 and 224 designate optically transparent bodies, and reference numeral 221 and 223 denote optically transparent adhesive layers. Reference numerals 219 and 228 denote incident lights. For example, assuming that the light metering area of zone A (average light metering) is 28 mm×16 mm, that the light metering area of zone B (partial light metering) is 8 mm×12 mm and that the light metering of zone C (spot light metering) is 6 $\phi$mm, it has been empirically confirmed that in order to make the light reception coefficients of the respective light metering systems coincident with one another, the reflection factors of the reflective films in zones A, B and C may be selected to the order of 4%, 10% and 20%, respectively. The beam splitter shown in FIGS. 14A, 14B and 14C may be produced by a method of copy-making such as compression from a matrix and such method may be carried out, for example, in the following procedures. (i) Three types of matrices corresponding to the light metering systems A, B and C are formed by using a diamond cutting tool. (ii) What has resulted from the compression by the matrix corresponding to the light metering system C is 220 in FIGS. 14B and 14C, and what has been compressed while being held between the two matrices corresponding to the light metering systems A and B is 222 in FIGS. 14B and 14C. (iii) Reflective films are deposited by evaporation on the surfaces of the compressions obtained in step (ii) above. (iv) The compression articles with the reflective films deposited by evaporation thereon and an optically transparent body 224 for cover are adhesively secured together and made into a unit.

As indicated above, the beam splitter according to the second embodiment is a beam splitter comprising a diffraction lattice having at least two different light condensing points and can effect light metering having at least two types of light metering areas and, when the surfaces on which exist the diffraction lattices corresponding to the respective light metering areas are different from each other, it can equalize the quantities of metering light in the respective light metering areas by controlling the reflection factor of the reflective film provided on the relief type diffraction lattice. Thus, the second embodiment has a feature that it realizes two or more light metering systems by a single beam splitter and moreover, it can equalize the light reception coefficients of the respective light metering systems, thus eliminating the necessity of adjusting the light metering output level for each light metering system.

In the device according to a third embodiment of the present invention, the area proportion of the effective reflecting surface when the diffraction lattice is seen in a micro manner is made to differ between diffraction lattices, whereby the levels of the quantities of output light from the lattices are adjusted.

Figure 15A:
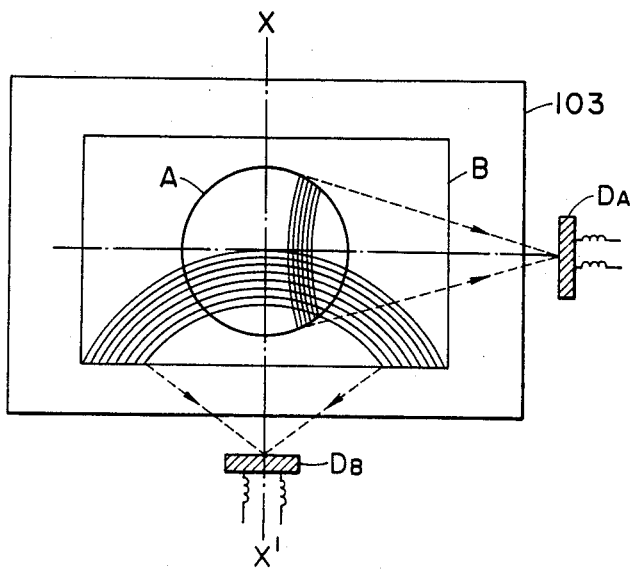
FIGS. 15A and 15B are a plan view and a cross-sectional view, respectively, of the device of a third embodiment in which the proportion of effective reflecting surface is made to differ between two lattices.
Figure 15B:
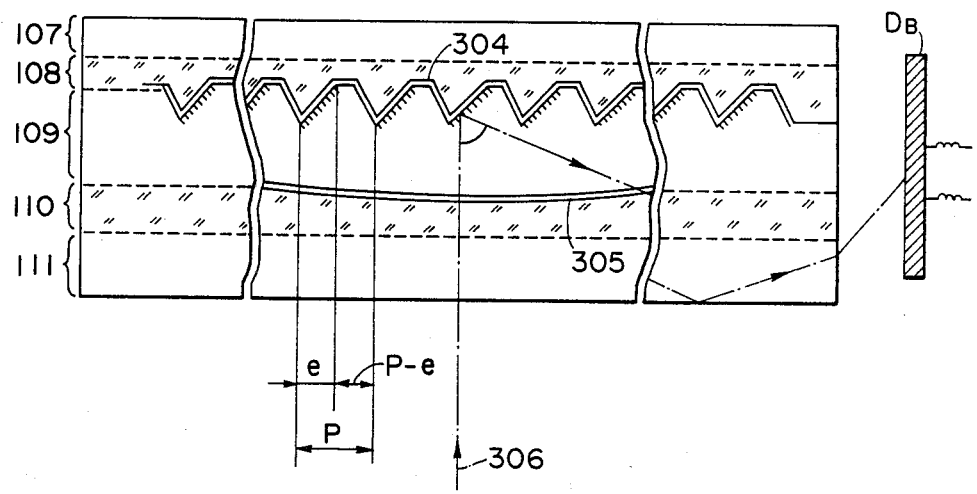

FIGS. 15A and 15B are a plan view and a cross-sectional view, respectively, of the device according to the third embodiment of the present invention which has two light condensing points and in which a light detector is disposed at each of the light condensing points. FIG. 15A shows the whole of a light metering view field 303 and, as seen therein, two zones, i.e. zone A and zone B are set with the center of the light metering view field as the center, the two zones being at least partly superposed one upon the other, so that the light having entered zone A (circular) is diffracted and guided to the light detector $D_A$ and the light having entered zone B (rectangular) is diffracted and guided to the light detector $D_B$. The lattices of zones A and B are endowed with light condensing action as in the beam splitter shown in FIG. 6, and lattice lines are formed in the form of concentric circles centered at the light detector to enable the metering light beam to be used effectively. FIG. 15B is a cross-sectional view taken along the plane X—X' of FIG. 15A. In FIG. 15B, reference numeral 304 designates a reflective film on the relief type diffraction lattice surface in zone B, reference numeral 305 denotes a reflective film on the relief type diffraction lattice surface in zone A, reference numerals 307, 309 and 311 designate optically transparent bodies, reference numerals 308 and 310 denote optically transparent adhesive layers, reference numeral 306 designates an incident light, and $D_B$ denotes a light detector disposed adjacent to the center of curvature of the lattice of zone B. In FIG. 15B, when the incident light 306 is reflected by the reflective film 304 and totally reflected by the upper and lower boundaries of the beam splitter and thereby directed to the light detector $D_B$ from the exit end facing the light detector $D_B$, the surface of the relief type diffraction lattice which causes the incident light 306 to travel toward the light detector $D_B$ side is referred to as the effective reflecting surface. In FIG. 15B, the surface indicated by hatching is the effective reflecting surface for forming a necessary split light.

The device of the present embodiment comprises a diffraction structure having at least two light condensing points and is characterized in that when light metering having at least two types of light metering areas is effected, it equalizes the quantities of metering light in the respective light metering areas by controlling the area proportion of the effective reflecting surface of the diffraction structure. In the present embodiment, it is not always a necessary condition that the surfaces on which exist the diffraction lattices corresponding to the respective light metering areas as shown in FIG. 15B are different from each other, but even if the diffraction lattices lie in the same surface, it is possible to equalize the quantities of metering light in the respective light metering areas. The area proportion of the effective reflecting surface means the rate of the effective reflecting surface contained in a unit area, and in the cross-section substantially perpendicular to the relief type diffraction lattice lines, it is defined as a proportion in the range of length L which is sufficiently small as compared with the length of one side of the beam splitting surface area (in the light metering device, the light metering surface), and in the case of a single lens reflex camera for example, L is of the order of 1 to 2 mm. In FIG. 15B, assuming that the width of one pitch of the relief type diffraction lattice is p, that the width of the reflecting surface effective to split the light entering the light detector is e and that Ng pitches of the relief type diffraction lattice lie over the length L, the area proportion of the effective reflecting surface is given by Nge/L. However, it should be understood that in this case, the lattices lying over the length L are all at equal pitches. In FIG. 15B, the light having entered the portion (p-e) of the lattice, even if reflected by the reflective film 304, does not arrive at that side on which the light detector $D_B$ is disposed, and this portion does not directly contribute to light metering. Accordingly, as is clear from the comparison between FIG. 5 and FIG. 15, in the relief type diffraction lattice of the present embodiment, part of the crest or valley of the concavo-convexity thereof is formed into a flat portion and even if this flat portion is provided with a reflective film, the incident light entering the beam splitter is incident on the flat portion substantially perpendicular thereto and little or no reflected light is produced. Accordingly, this flat portion does not contribute to light splitting and therefore, by arbitrarily determining the size of this flat portion, the area proportion of the effective reflecting surface can be set to a desired value. By thus varying the proportion occupied by the portion e of the effective reflecting surface over the length L, it is possible to equalize the quantities of metering light in the light metering areas A and B while the reflection factor of the reflective film remains constant. In accordance with the fact that A is greater in light metering area than B, the area proportion of the effective reflecting surface may be made greater than B.

Also, as shown in FIG. 15B, pitch P is invariable and therefore, when light 306 of wavelength λ enters and split light is reflected and diffracted at an angle θ, there is a relation that $$2np \sin \theta = N \times \lambda \tag{10}$$

between the angle of diffraction θ and the order N of the diffracted light (N is an integer), and thus, even if a flat portion is provided in the lattice, the direction of diffraction of the diffracted light is invariable. In equation (10), n is the refractive index of the optically transparent body 309.

Figure 16A:
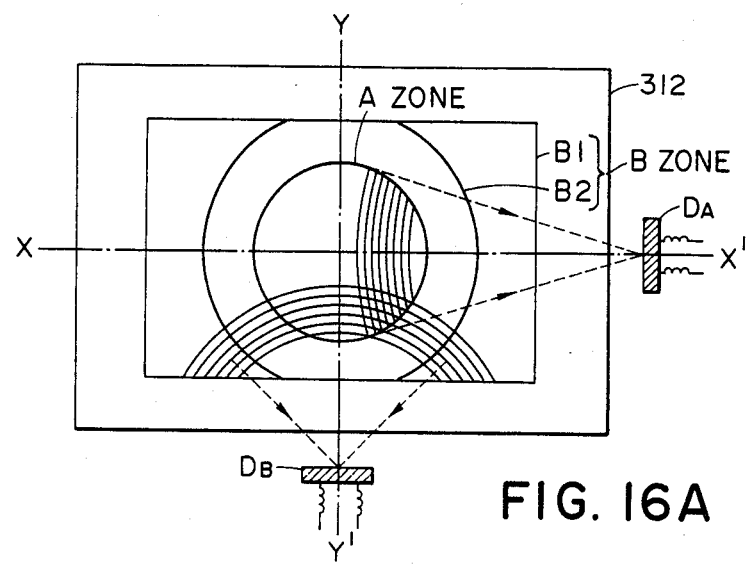
FIGS. 16A, 16B and 16C are a plan view and two cross-sectional views of a device in which a distribution of the proportion of effective reflecting surface is provided in one of the two lattices.
Figure 16B:
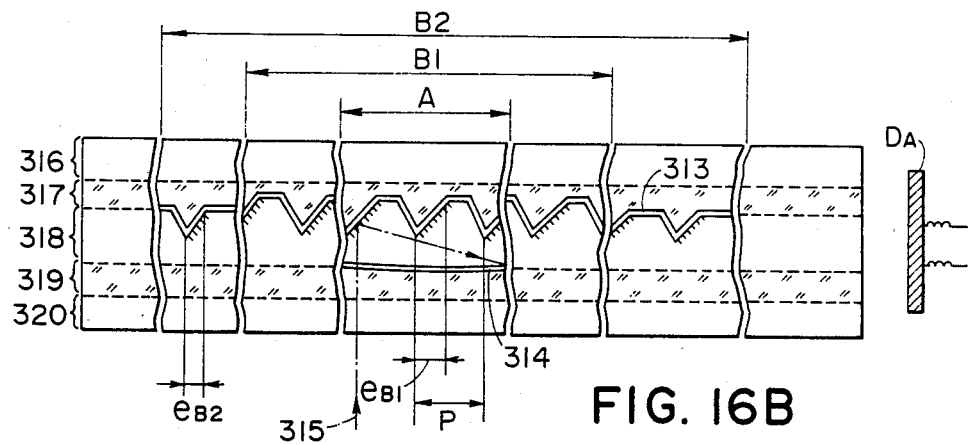
Figure 16C:
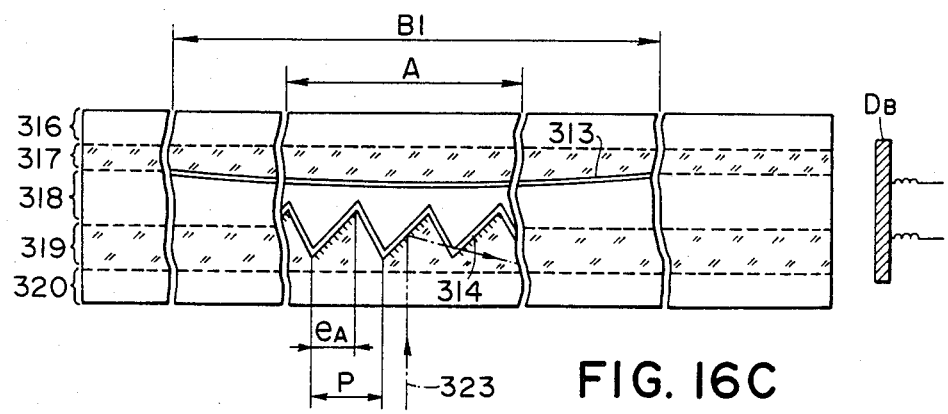
Figure 17:
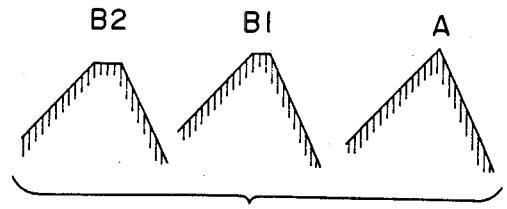
FIG. 17 is a cross-sectional view of a diamond cutting tool used to make the device shown in FIG. 16A.

FIGS. 16A, 16B and 16C shows another modification. In FIG. 16A, two zones A and B are set in the light metering view field 312, zone A corresponds to partial light metering and zone B corresponds to average light metering, and zone B is divided into two subzones B1 and B2. FIGS. 16B and 16C are cross-sectional views taken along the plane X—X' and the plane Y—Y', respectively, of FIG. 16A, and the lattice portion in particular is shown enlarged therein. In FIGS. 16B and 16C, reference numerals 315 and 323 designate incident lights, reference numeral 313 denotes a reflective film provided on the lattice in zone B, reference numeral 314 designates a reflective film provided on the lattice in zone A, reference numerals 316, 318 and 320 designate optically transparent bodies, and reference numerals 317 and 319 denote transparent adhesive layers. Assuming that the widths of the effective reflecting surfaces of zones A, B1 and B2 as seen from the incident light side in the cross-section substantially perpendicular to the lattice lines are $e_A$, $e_{B1}$ and $e_{B2}$, these widths are set to $e_A > e_{B1} > e_{B2}$ in this beam splitter and the quantity of metering light in zone A is equal to the quantity of light in zone B and zone B is such that the central portion of the light metering view field is preponderantly metered. Zones A, B1 and B2 are equal in pitch of the lattice and the quantities of metering light are equalized by changing only the area proportions $e_A$, $e_{B1}$ and $e_{B2}$ of the effective reflecting surfaces. In the method of providing flat portions on the lattice as shown in FIGS. 16B and 16C, if it resorts to a method of obtaining the optically transparent body 318 by compression molding, the end of the diamond cutting tool for making the matrix of compression may be such as shown in FIG. 17. In FIG. 17, the appellations given to the cutting tool correspond to the appellations of the respective zones.

Figure 18A:
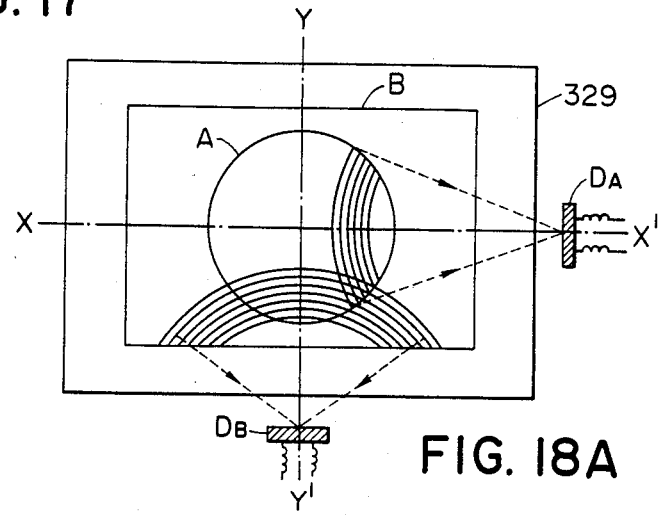
FIGS. 18A, 18B and 18C are a plan view and two cross-sectional views of a device in which two lattices which are different in the proportion of effective reflecting surface are provided in the same plane.
Figure 18B:
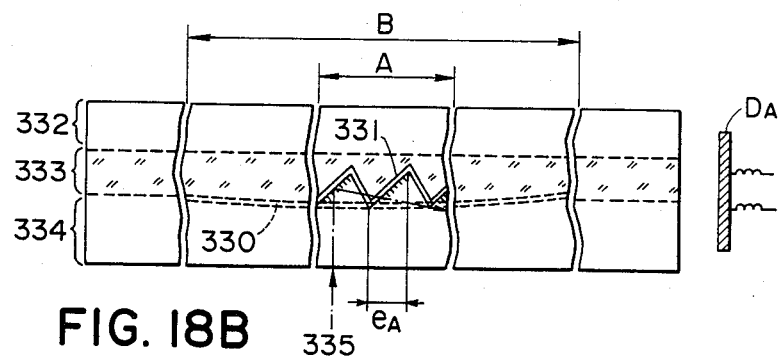
Figure 18C:
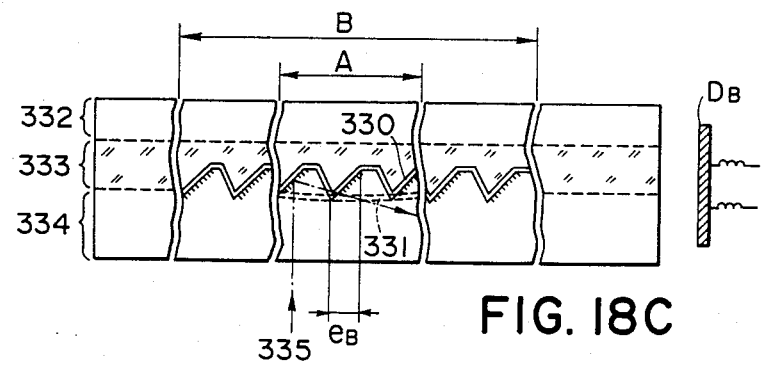

FIGS. 18A, 18B and 18C show still another modification. In FIG. 18A, as in the example shown in FIGS. 15A, 15B and 15C, there are two types of light metering areas in the light metering view field 329 and light detectors $D_A$ and $D_B$ are disposed adjacent to the light condensing points of the lattice corresponding to the respective light metering areas. FIGS. 18B and 18C are cross-sectional views taken along the plane X—X' and the plane Y—Y', respectively, of FIG. 18A. A is the area for partial light metering and B is the area for average light metering. As shown in FIGS. 18B and 18C, in the case of the present embodiment, the lattices in zones A and B lie in the same plane. Reference numeral 331 designates a reflective film provided on the diffraction lattice surface for directing light to the light detector $D_A$, reference numeral 330 denotes a reflective film provided on the diffraction lattice surface for directing light to the light detector $D_B$, reference numeral 335 designate an incident light, reference numerals 332 and 334 denote optically transparent bodies, and reference numeral 333 designates a transparent adhesive layer. Since the area of zone A is smaller than the area of zone B, the quantities of metering light in zones A and B are equalized by increasing the length of the effective reflecting surface. That is, $e_A > e_B$.

In the embodiments of FIGS. 15, 16 and 18, a flat portion is provided at each pitch and the area proportion of the effective reflecting surface is varied by adjusting the rate of the flat portion to the pitch, but alternatively, the area proportion of the effective reflecting surface may be varied by providing a flat portion by one pitch at every several pitches. Generally, if a flat portion corresponding to Ng' pitches is provided at every Ng pitches, the area proportion of the effective reflecting surface will be (Ng–Ng')c∠p.Ng and, by suitably adjusting the length of the flat portion, the area proportion of the effective reflecting surface can be set to a desired magnitude. It is also possible to divide the area of each light metering system into several subareas and vary the area proportion of the effective reflecting surface at finer area unit. Again in this case, it is possible to equalize the quantities of metering light of the respective light metering systems.

As indicated above, the device of the present embodiment is a beam splitter which comprises a plurality of diffraction lattices for splitting part of incident light in different directions and in which, when beam splitting having beam splitting areas of at least two types of areas is to be effected, the quantities of split light in the respective beam splitting areas can be equalized by controlling the shape of the diffraction lattices, particularly the area proportion of the effective reflecting surface. Thus, the device, when applied to a light metering device, has a feature that it realizes two or more light metering systems by a single beam splitter and can moreover equalize the light reception coefficients of the respective light metering systems, thus eliminating the necessity of adjusting the metering output level for each light metering system.

The above-described beam splitter of the present invention which is useful for the light metering device of a camera may be disposed in the light beam from an object which enters the camera, and can split part of the light beam without very much affecting the light beam. The position whereat the beam splitter is disposed may be the vicinity of the image plane of the finder system or one of other various positions within the camera as disclosed in the aforementioned Japanese Laid-open patent application No. 42042/1978. This also holds true for the applications thereof.

We claim:

1. A device for measuring light incident on an image forming optical system, comprising:
    an image forming optical system defining an optical path;
    a beam splitter disposed in said optical path and having a plurality of diffraction lattices of different predetermined areas, each of said diffraction lattices providing, when even input light is incident on each of said diffraction lattices, substantially the same total quantity of diffracted light irrespective of the difference in the areas of the diffraction lattices; and
    light measuring means having photodetector means for receiving the diffracted light from said diffraction lattices.

2. A device according to claim 1, wherein said plurality of diffraction lattices have at least portions thereof overlapping each other.

3. A device according to claim 1, wherein each of said diffraction lattices has a lattice element curved with a predetermined curvature so that said diffracted light is condensed.

4. A device according to claim 3, wherein the condensing point of said diffracted light is different between said diffraction lattices.

5. A device according to claim 1, wherein each of said plurality of diffraction lattices has a lattice surface, each lattice surface lying in a different plane.

6. A device according to claim 1, wherein each of said diffraction lattices is formed by a first transparent member having a surface coated with a semi-reflecting material and formed with a relief structure, and a second transparent member, said first and second transparent members being cemented together with the cement filling said relief structure.

7. A device according to claim 1, wherein each of said diffraction lattices is a relief type diffraction lattice having a plurality of periodically arranged semi-reflecting oblique surfaces.

8. A device according to claim 7, wherein the sizes of the semi-reflecting oblique surfaces, from lattice to lattice, are different from one another.

9. A device according to claim 8, wherein the distributions of the angle of inclination of said oblique surfaces in said diffraction lattices are different from one another.

* * * * *

UNITED STATES PATENT AND TRADEMARK OFFICE
CERTIFICATE OF CORRECTION

PATENT NO.  : 4,544,269
DATED       : October 1, 1985
INVENTOR(S) : NORIYUKI NOSE, ET AL.

It is certified that error appears in the above-identified patent and that said Letters Patent is hereby corrected as shown below:

Column 1, line 46, change "concave-convex" to --concavo-convex--.
Column 2, line 2, change "therefore and," to --therefore,--.
Column 4, line 24, after "diffraction" insert --lattice--.
Column 6, line 32, change "vary" to --very--.
Column 10, line 31, change "As" to --A--.
Column 11, line 21, change "guide" to --guided--.
Column 12, line 28, change "illustrates" to --illustrate--.
Column 15, line 14, change "16C shows" to --16C show--;
          line 66, change "designate" to --designates--.
Column 18, line 12, change "according to claim 8" to
                    --according to claim 7--.

Signed and Sealed this

Ninth Day of September 1986

[SEAL]

Attest:

DONALD J. QUIGG

Attesting Officer

Commissioner of Patents and Trademarks